United States Patent
Pawar

(10) Patent No.: US 9,841,203 B2
(45) Date of Patent: Dec. 12, 2017

(54) APPARATUS AND METHODS FOR POWER STEALING BY CONTROLLERS

(71) Applicant: Emerson Electric Co., St. Louis, MO (US)

(72) Inventor: Harshal Manik Pawar, Pune (IN)

(73) Assignee: Emerson Electric Co., St. Louis, MO (US)

( * ) Notice: Subject to any disclaimer, the term of this patent is extended or adjusted under 35 U.S.C. 154(b) by 652 days.

(21) Appl. No.: 14/536,922

(22) Filed: Nov. 10, 2014

(65) Prior Publication Data

US 2016/0018836 A1    Jan. 21, 2016

(30) Foreign Application Priority Data

Jul. 17, 2014    (IN) .......................... 2321/MUM/2014

(51) Int. Cl.
| | |
|---|---|
| *F24F 11/00* | (2006.01) |
| *G05D 23/19* | (2006.01) |
| *H02M 5/00* | (2006.01) |
| *H02M 7/00* | (2006.01) |
| *G05F 1/66* | (2006.01) |

(52) U.S. Cl.
CPC .......... *F24F 11/006* (2013.01); *F24F 11/001* (2013.01); *F24F 11/0009* (2013.01); *G05D 23/1902* (2013.01); *G05D 23/1919* (2013.01); *G05F 1/66* (2013.01); *H02M 5/00* (2013.01); *H02M 7/00* (2013.01)

(58) Field of Classification Search
None
See application file for complete search history.

(56) References Cited

U.S. PATENT DOCUMENTS

| | | | | |
|---|---|---|---|---|
| 5,736,795 | A | 4/1998 | Zuehlke et al. | |
| 5,903,139 | A * | 5/1999 | Kompelien | H02M 5/293 307/39 |
| 6,490,174 | B1 * | 12/2002 | Kompelien | H02M 5/293 323/282 |
| 8,110,945 | B2 * | 2/2012 | Simard | H02M 5/2573 307/51 |
| 2003/0090243 | A1 * | 5/2003 | Atherton | H02M 5/293 323/239 |

OTHER PUBLICATIONS

Canadian Office Action issued in Canadian Patent Application No. 2,871,207 dated Mar. 31, 2016, which has the same priority claim as the instant application; 6 pgs.

* cited by examiner

*Primary Examiner* — Qing Yuan Wu
(74) *Attorney, Agent, or Firm* — Harness, Dickey & Pierce, P.L.C.

(57) ABSTRACT

A controller for use in a climate control system includes a power stealing circuit connectible with a control of the climate control system and configured for stealing power via a signal from a power source through the control. An overcurrent limiting circuit is configured to limit a first portion of the signal to prevent a false call for operation of the control. The overcurrent limiting circuit is further configured not to limit a second portion of the signal to prevent a false call, where the control is configured to recognize only the first portion as determinative of whether the signal is a call for operation.

20 Claims, 8 Drawing Sheets

Call Generated 24Vac

Voltage Across Power Stealing Resistor:

Rectifier Output:

US 9,841,203 B2

APPARATUS AND METHODS FOR POWER STEALING BY CONTROLLERS

CROSS-REFERENCE TO RELATED APPLICATION

This application claims the benefit and priority of Indian Application No. 2321/MUM/2014, filed Jul. 17, 2014. The entire disclosure of the above application is incorporated herein by reference.

FIELD

The present disclosure relates to apparatus and methods for power stealing by controllers.

BACKGROUND

This section provides background information related to the present disclosure which is not necessarily prior art.

Digital thermostats and other climate control system controllers typically have microcomputers and other components that continuously use electrical power. Various thermostats may utilize power stealing to obtain operating power. Thus, for example, when a load (e.g., a compressor, fan, or gas valve) in a climate control system has been switched off, operating power for the thermostat may be stolen from the circuit for that load.

SUMMARY

This section provides a general summary of the disclosure, and is not a comprehensive disclosure of its full scope or all of its features.

Exemplary embodiments or implementations are disclosed of methods and apparatus for power stealing by a controller. An exemplary implementation is directed to a controller for use in a climate control system. In this example, the controller includes a power stealing circuit connectible with a control of the climate control system and configured for stealing power from a power source via a signal through the control. An overcurrent limiting circuit is configured to limit a first portion of the signal to prevent a false call for operation of the control. The overcurrent limiting circuit is further configured not to limit a second portion of the signal to prevent a false call, where the control is configured to recognize only the first portion as determinative of whether the signal is a call for operation.

In another example implementation, the disclosure is directed to a method performed by a controller in a climate control system. The controller configures and sends a signal having first and second portions to a control of the climate control system such that only the first portion is determinative of whether the signal is a call for operation of the control. The controller limits the first portion to prevent a false call for operation of the control. The controller steals power during at least the second portion.

In another example embodiment, a controller for use in a climate control system includes a power stealing circuit connectible with a control of the climate control system. The power stealing circuit is configured for stealing power via a signal from a power source through the control. An overcurrent limiting circuit is configured to limit only a positive portion of the signal to prevent a false call for operation of the control, where only the positive portion is determinative of whether the control recognizes the signal as a call for operation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

and

Figure 11:
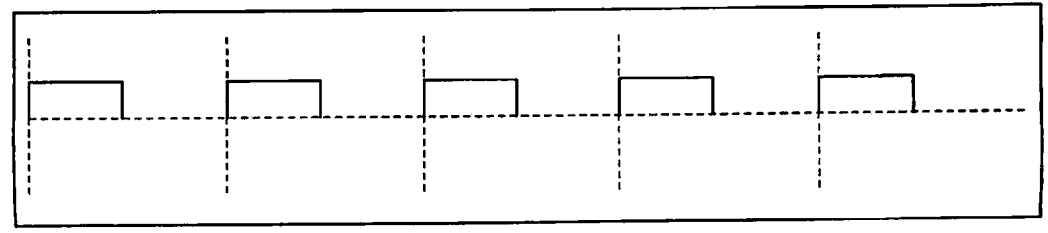

FIG. 11 is a diagram of a climate control system signal generated in accordance with exemplary embodiments of the present disclosure.

Corresponding reference numerals and/or reference characters indicate corresponding parts throughout the several views of the drawings.

DETAILED DESCRIPTION

Example embodiments will now be described more fully with reference to the accompanying drawings.

The inventor has observed that battery-powered thermostats often are not connected to a common (C) terminal of a climate control system transformer. Power stealing mechanisms in battery powered thermostats typically have limitations, in that (1) power stealing often is not operable while a call for heat or cool is present, and (2) amounts of power drawn through power stealing can be very limited. In a typical HVAC system, a thermostat controls heating and/or cooling devices based on demand for heating and/or cooling. Many thermostats send signals to heating and/or cooling devices by switching an RC/RH line from a climate control system transformer, which typically provides 24V AC.

Figure 1:
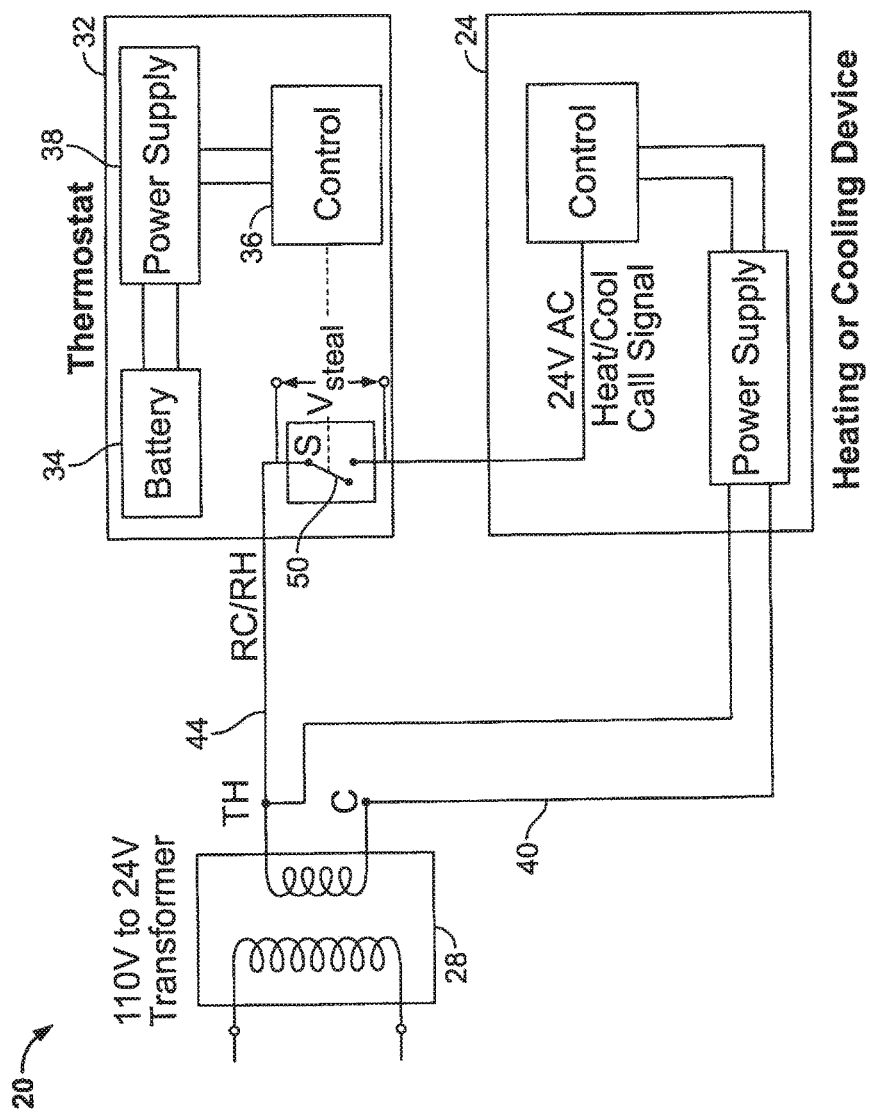
FIG. 1 is a diagram of a conventional climate control system.

An example conventional climate control system is indicated in FIG. 1 by reference number 20. In the system 20, a heating or cooling device 24 receives power from a transformer 28 and receives operational signals from a thermostat 32. The thermostat 32 is powered by one or more battery(s) 34. For example, a control 36, e.g., a microprocessor, receives power from a power supply 38 connected to the battery(s) 34. The thermostat 32 does not have a connection with a common (C) wire 40 of the transformer 28. Thus the thermostat 32 performs power stealing, e.g., by drawing power from the transformer 28 via a RC/RH line 44. As shown in FIG. 1, when there is no call for heat/cool, a switch S (e.g., a relay 50 inside the thermostat 32) is open and a voltage $V_{steal}$ across S can be used to draw a small amount of current through the RC/RH line 44. Notably, drawing more than a limited amount of current when the switch S is open can increase $V_{steal}$ and could result in a false call, e.g., for heat or cool. If the switch S is closed, e.g., when a call for heat or cool is present, $V_{steal}$ is zero and no power stealing current can be drawn.

Figure 2:
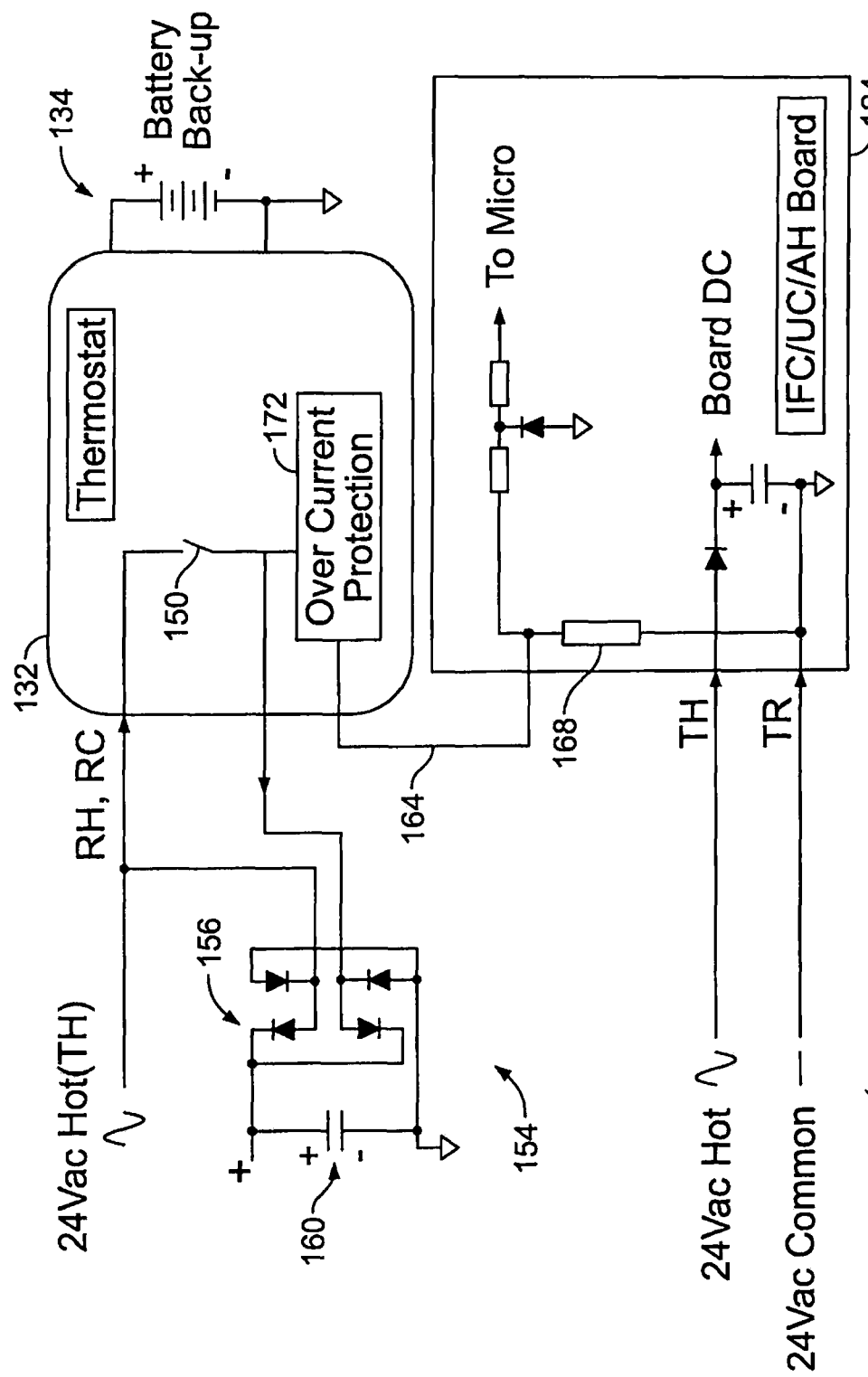
FIG. 2 is a diagram of a climate control system having a thermostat configured in accordance with an exemplary embodiment of the present disclosure.

One example embodiment of a climate control system in accordance with various aspects of the disclosure is indicated in FIG. 2 by reference number 100. A control 124, e.g., a heating or cooling device, receives power from transformer hot and common wires TH and TR and receives operational signals from a thermostat 132. In various embodiments the control 124 may be, e.g., a furnace control, a universal control, an air handling control, etc. The thermostat 132 has a backup battery 134. A relay switch 150 is driven by the thermostat 132 and represents a thermostat call relay for activating a control of the climate control system 100, e.g., for W1, W2, Y1, Y2, G, O, etc.

In the present example system 100, if the relay switch 150 is switched open, then a power stealing circuit 154 steals power, through the control 124, from the transformer hot and common wires TH and TR. In the present example embodiment, a rectifier bridge 156 provides output and a capacitor 160 at the output of bridge 156 filters out ripples. The thermostat 132 may receive operating power from the capacitor 160. Additionally or alternatively, power stealing may be performed to maintain a charge in the backup battery 134. If the charge at the capacitor 160 decreases to a minimum level then the thermostat 132 may switch to a back-up supply from the battery 134. (In the present example embodiment, the rectifier bridge 156, capacitor 160 and battery 134 are provided inside the thermostat 132, although shown for simplicity in FIG. 2 as being outside the thermostat.) In some embodiments the battery 134 and capacitor 160 may be hardwired in such a way that the thermostat 132 could receive power from the battery 134 automatically if, e.g., voltage across the capacitor 160 decreases to a predetermined minimum level.

The capacitor 160 cannot be charged if, e.g., the relay 150 inside the thermostat 132 is turned ON, e.g., closed, to generate, e.g., a W1 or Y1 call. The input terminals of the rectifier bridge 156 are then tied to same potential (e.g., 24VAC) and so the bridge 156 cannot charge the capacitor 160. If the relay 150 remains closed for a long time, then the capacitor 160 may get discharged and so the thermostat 132 may start using the power supply from the battery 134. On the other hand, when the relay 150 is open and a call signal path 164 is used for power stealing, a false call may be generated. For example, the control 124 includes a voltage drop resistor 168 connected across the call signal path 164 and the common wire TR. A current flow across the resistor 168 might cause voltage development across the resistor 168 sufficient to cause false call signal activation at the control 124. Under such circumstances, power drawn during power stealing can be low, and a thermostat operating at its full capacity could ultimately use a battery backup supply.

The inventor has observed, however, that although the thermostat 132 may send a signal (which may or may not be a call signal) from the RH/RC (24Vac) wires to the control 124, the control 124 in turn rectifies the signal to sense it and de-bounce it. In various embodiments of the disclosure, a thermostat or other climate control system controller is provided that is configured, e.g., to draw a maximum available amount of power through power stealing when there is no call signal present. In one example embodiment, a controller such as a thermostat includes a power stealing circuit connectible with a climate control system control. The power stealing circuit is configured for stealing power via a signal from a power source through the control. An overcurrent limiting circuit of the thermostat is configured to limit a first portion of the signal to prevent a false call for operation of the control. The overcurrent limiting circuit is further configured not to limit a second portion of the signal to prevent a false call, where the control is configured to recognize only the first portion as determinative of whether the signal is a call for operation.

For example, referring to FIG. 2, an overcurrent limiting circuit 172 is provided in the thermostat 132 to prevent, e.g., excessive currents that might cause a false call. The inventor has observed that many if not most climate control system controls, e.g., heating/cooling device microcontrollers, check for logic "1" and logic "0" signals. Although an AC signal may be received as an input, an internal diode, for example, may be provided that allows only a positive signal while a negative signal is filtered out. Some devices may use, e.g., a half-wave rectified signal on a board for sensing and de-bouncing a call signal. A resultant signal thus may be logic "1" for a positive half cycle and logic "0" for a negative half cycle. The negative half cycle may be rectified and considered as logic "0," e.g., at a call receiving unit of a climate control system furnace control or universal control (IFC/UC).

So providing only positive half cycles to the board can cause the same signal to appear, e.g., at a call receiving microprocessor pin as if a full wave RC/RH signal had been sent to the board. Accordingly, current drawn during a negative half cycle (that is, a negative cycle at RC/RH terminal with respect to Common) causes a voltage drop across the resistor but has no effect on a call receiving device since this negative half cycle is clipped by the hardware of the call receiving device.

Thus in various implementations of the disclosure, as much power as possible may be stolen during a negative cycle of the RC/RH line, regardless of whether a call is present or absent. In some implementations, maximum power may be obtained through power stealing where current, e.g., for negative half cycles of a signal from RC/RH wires is not limited, e.g., by a current limiting circuit, if any. In such manner, a maximum current flow can be obtained through the terminal resistor during negative voltage at the resistor. Such a flow would not cause a false call to be generated, since the voltage across the resistor would fall only at negative half cycles. In the embodiment of FIG. 2, the overcurrent limit circuit 172 does not limit negative voltage development but may prevent excessive positive voltage development across the resistor 168 to avoid false call generation. Thus current may be limited, e.g., on positive half cycles, so that limited power stealing may be performed during positive half cycles.

In various embodiments, power stealing also may be enabled during a call for activating a control. As explained above, power stealing circuitry could obtain maximum power, e.g., during a negative half cycle where there is no limit on current flow. Since current flowing through a voltage drop resistor of a control call receiving unit for negative half cycles does not affect call de-bouncing logic of the call receiving unit, a maximum available amount of power can be obtained during these negative half cycles where there is no current limit for negative half cycles. In the present context, "negative" means that a RH/RC signal is negative with reference to common.

The inventor has further observed that a negative half cycle is filtered out of a call signal at the call receiving units of many controls. Therefore if a negative half cycle is not provided to such a call receiving unit and the signal path is OFF for negative half cycles, a power stealing circuit bridge rectifier would get the potential difference across its input terminals, providing the output voltage for power stealing. The call receiver unit would not be able to recognize that a negative cycle is not present but would recognize the signal as a call signal. The same signal would appear at a call receiving microprocessor pin as would appear if a full wave RC/RH signal were received. Accordingly the call would activate the control.

Various ways and embodiments are possible in which power stealing can be performed while a call is present. In some embodiments portions of a call signal may be removed momentarily. For example, where a RC/RH signal is used as a call signal (e.g., W1, Y1, G, O, W2, Y2, etc.), the call can be removed momentarily for partial half cycle(s), or for complete half cycle(s), or for complete full cycle(s), or for various combinations of the foregoing. For example, a call may be removed momentarily by simply not allowing a negative cycle to the call receiving unit, e.g., by adding a diode to the switching relay, etc. When the relay is turned ON, it will conduct for positive cycles only and not for negative cycles. Thus for negative cycles, a rectifier bridge will get a potential difference and will provide output voltage. "Removing a call momentarily" means that the same signal as that of RH/RC signal would not be applied. Many types of signal could be used as a call signal. Additionally or alternatively, a 0V signal, a positive DC voltage and/or a negative DC voltage could be used as call signals. Thus, in various embodiments, instead of keeping a call signal (e.g., W1, Y1, etc.) ON continuously, the call signal could be switched ON and/or OFF. For example, a device could be configured in a thermostat to rectify a 24VAC signal to provide a +Ve or −Ve cycle without causing an effect on signal de-bouncing at a control receiver unit. When such a switching device is in the OFF state for complete or partial half/full cycle(s), a power stealing circuit bridge rectifier would have one input connected to a C terminal, e.g., through a voltage drop resistor of the control, and the other input connected, e.g., to a 24VAC RC/RH wire.

Figure 3:
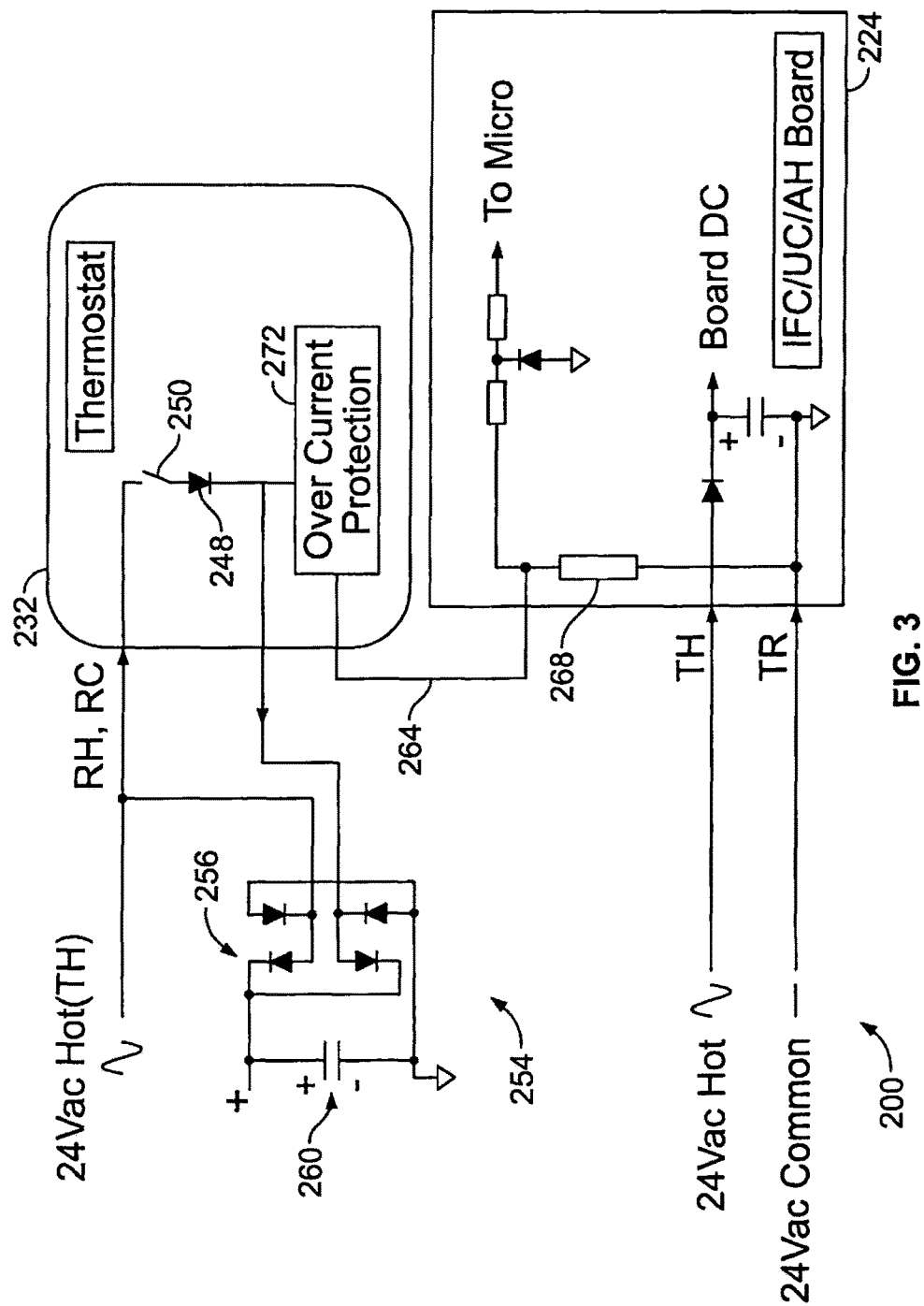
FIGS. 3 and 4 are diagrams of climate control systems having thermostats configured in accordance with exemplary embodiments of the present disclosure.

Another example embodiment of a climate control system is indicated generally in FIG. 3 by reference number 200. A control 224, e.g., a heating or cooling device, receives power from transformer hot and common wires TH and TR and receives operational signals from a thermostat 232. A diode 248 is provided in series with a relay 250 for activating a control of the climate control system 200, e.g., for W1, W2, Y1, Y2, G, O, etc.

A power stealing circuit 254 is configured to steal power, through the control 224, from the transformer hot and common wires TH and TR. In the present example embodiment, a rectifier bridge 256 provides output and a capacitor 260 at the output of bridge 256 filters out ripples. The thermostat 232 receives operating power from the capacitor 260. (The rectifier bridge 256 and capacitor 260 are provided inside the thermostat 232 although shown as being outside the thermostat.) In the present example embodiment, no backup battery is provided.

When the relay 250 is closed to generate a call signal, the diode 248 is OFF during a negative cycle of the call signal, thereby causing a voltage difference at inputs of the bridge rectifier 256 and enabling power stealing. When the relay 250 is open, a call signal path 264 is used for power stealing. The control 224 includes a voltage drop resistor 268 connected across the call signal path 264 and the common wire TR. An overcurrent limiting circuit 272 is provided in the thermostat 232 to prevent, e.g., excessive currents that might cause a false call when a positive portion of a signal is transmitted through the call signal path 264. Thus in some embodiments the overcurrent limiting circuit 272 may provide overcurrent protection only when RH/RC/TH terminal voltages are positive with reference to a common TR terminal voltage.

Figure 4:
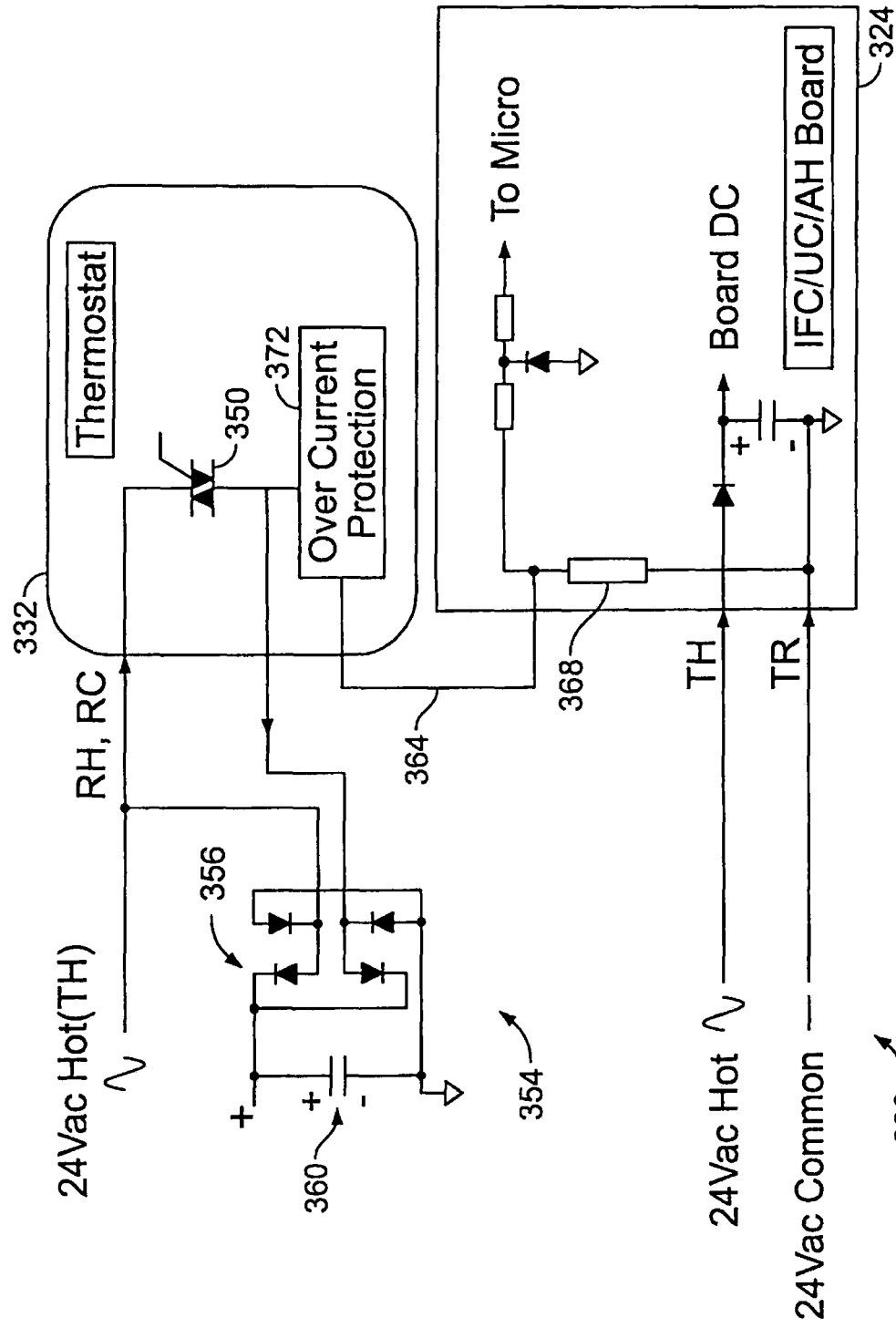

Another example embodiment of a climate control system is indicated generally in FIG. 4 by reference number 300. A control 324, e.g., a heating or cooling device, receives power from transformer hot and common wires TH and TR and receives operational signals from a thermostat 332. A triac 350, which may be optically isolated, is configured to be driven by the thermostat 332 to generate a call signal for activating a control of the climate control system 300, e.g., for W1, W2, Y1, Y2, G, O, etc.

A power stealing circuit 354 is configured to steal power, through the control 324, from the transformer hot and common wires TH and TR. In the present example embodiment, a rectifier bridge 356 provides output and a capacitor 360 at the output of bridge 356 filters out ripples. The thermostat 332 receives operating power from the capacitor 360. (The rectifier bridge 356 and capacitor 360 are provided inside the thermostat 332 although shown as being outside the thermostat.) In the present example embodiment, no backup battery is provided.

When the triac 350 is driven to generate a call signal, a voltage difference is caused at inputs of the bridge rectifier 256, thereby enabling power stealing. When no call signal is being generated, a call signal path 364 is used for power stealing. The control 324 includes a voltage drop resistor 368 connected across the call signal path 364 and the common wire TR. An overcurrent limiting circuit 372 is provided in the thermostat 332 to prevent, e.g., excessive currents that might cause a false call when a positive portion of a signal is transmitted through the call signal path 364. Thus in some embodiments the overcurrent limiting circuit 372 may provide overcurrent protection only when RH/RC/TH terminal voltages are positive with reference to a common TR terminal voltage.

In various implementations a call signal may be modified, e.g., by changing the amplitude of the call signal (W1, Y1, G, O, W2, Y2 etc.) compared with thermostat supply line signal (RC, RH) voltage. When a call signal has a different amplitude with reference to the thermostat RC/RH signal, then a voltage difference is produced at inputs of a power stealing circuit bridge rectifier that can cause power stealing. Additionally or alternatively, a call signal may be modified, e.g., by applying a square wave or triangular wave to the control receiver unit as a call signal. A DC supply voltage available at the thermostat could be used for this purpose.

In various implementations of the present disclosure, a power stealing circuit can obtain sufficient power to operate a thermostat irrespective of call status. When no call is present, a power stealing circuit can draw power (albeit limited power), e.g., during positive half cycles as well as maximum power during negative half cycles. In various embodiments when a call is present, power may be stolen only during negative half cycles at maximum power.

Power drawn by a power stealing circuit can be stored, e.g., in a high-value capacitor (having a capacity e.g., of a few millifarads or farads) so as to satisfy varying power consumption requirements of a thermostat. Power can be stolen both when there is a call and when there is no call from a thermostat. Such power stealing would not affect a control call receiver unit, where microcontroller I/O pins of the control are designed to have only logic "0" or logic "1" signals and where the control de-bounces an input signal for an appropriate number of cycles.

Aspects of the disclosure can be implemented in relation to various switching devices, including but not limited to relays, triacs, SCRs (thyristors), transistors (substantially all types), diodes in series with relays, resistors in series with relays (e.g., voltage dividers), MOSFETs, etc. Such devices could be used for providing call signals in various embodiments, and a potential difference across rectifier bridge inputs could cause the charging of a capacitor used for providing power to a thermostat. Thus in various embodiments, a thermostat would not require a battery backup for its operation. In some embodiments, a microprocessor real time clock (RTC) may be kept running by providing a super capacitor to keep the time and date running when, e.g., power for a 24VAC climate control system is shut off. When no call is being generated by a thermostat, a status of the call generator of the thermostat would be normally OFF. During such period, a power stealing circuit bridge rectifier would also get a potential difference at its inputs, thereby causing capacitor charging.

In a thermostat or other controller in which an overcurrent limiting circuit is provided, the overcurrent limiting circuit can be used, e.g., as a protection circuit to prevent overcurrent in the event of a short circuit or heavy load connection. The overcurrent limiting circuit thus could be used to prevent damage to switching device(s) used as a call generator.

Various methods and switching devices may be used to obtain power for a thermostat while a call signal is being generated by the thermostat. For example, relay and diode combinations, triacs, SCRs, relays, transistors, MOSFETs, etc. may be used to enable power stealing when the call is logically present, e.g., to a control.

Figure 5A:
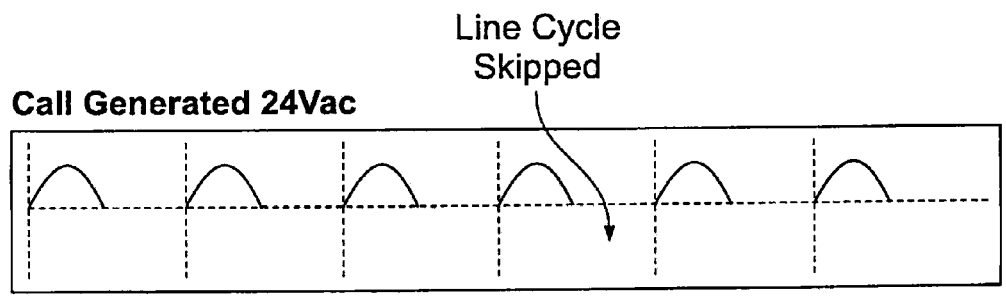
FIGS. 5A-5C are diagrams of climate control system signals generated in accordance with exemplary embodiments of the present disclosure.
Figure 5B:
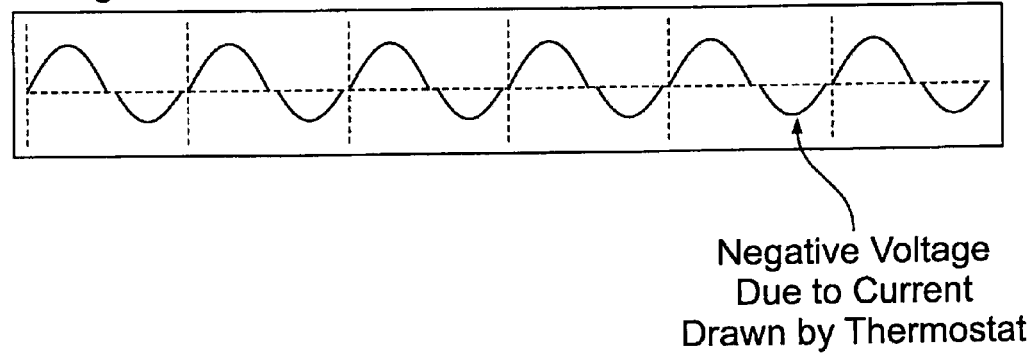
Figure 5C:
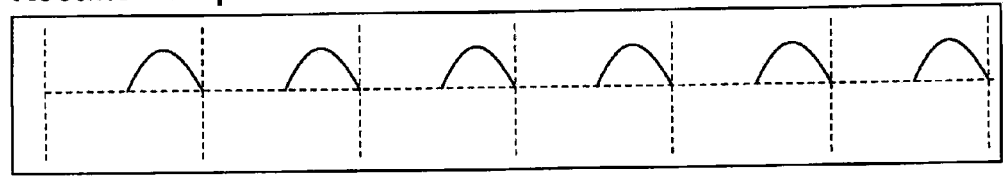

One example method includes skipping any +Ve or −Ve cycle from a call signal. Where, for example, a −Ve cycle is skipped, signals may be generated, e.g., as shown in FIGS. 5A-5C. FIG. 5A illustrates a call signal generated by skipping a negative half cycle from a line signal, e.g., a RC/RH signal. As shown in FIG. 5B, a voltage generated across a voltage drop resistor of a control receiving the call signal of FIG. 5A may include a negative voltage caused by current draw by the thermostat. A power stealing circuit bridge rectifier may respond to the voltage shown in FIG. 5B by outputting a voltage to a supply capacitor, e.g., as shown in FIG. 5C.

Figure 6A:
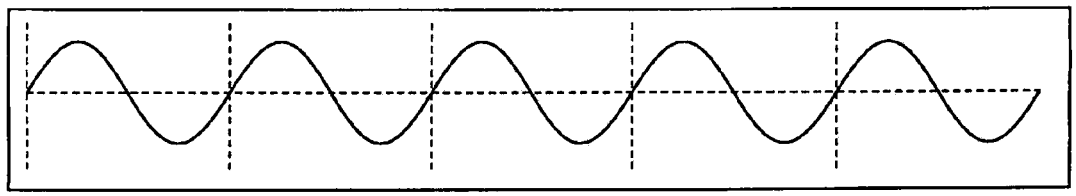
FIGS. 6A-6D are diagrams of climate control system signals generated in accordance with exemplary embodiments of the present disclosure.
Figure 6B:
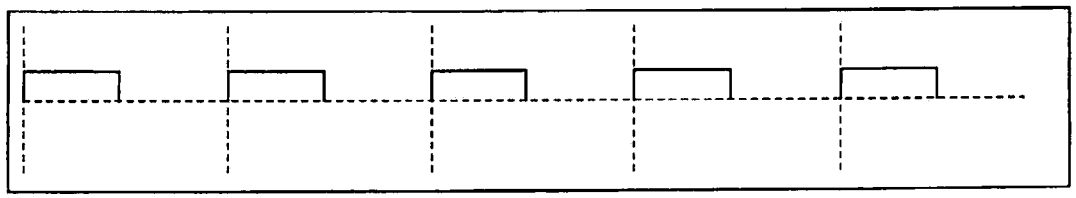
Figure 6C:
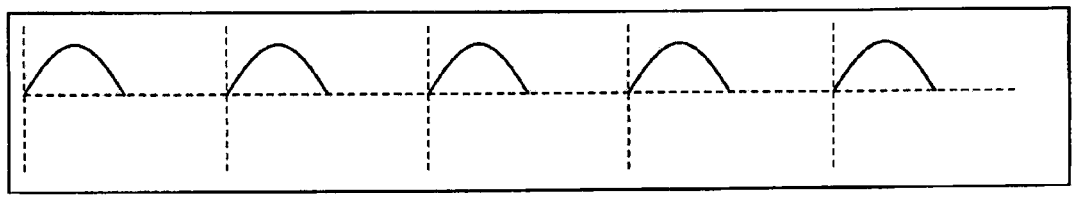
Figure 6D:
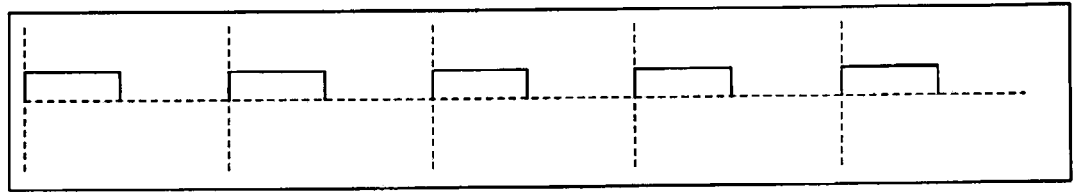

A comparison of signals generated in accordance with various implementations is illustrated in FIGS. 6A-6D. FIG. 6A illustrates a 24VAC call signal generated by a thermostat without modifying the signal as described above. The call signal of FIG. 6A appears at a microprocessor pin of a given control as shown in FIG. 6B. As shown in FIG. 6C, a −Ve half cycle is clipped from the signal of FIG. 6A to obtain a modified call signal. The call signal of FIG. 6C appears at the control microprocessor pin as shown in FIG. 6D.

It can be seen that the signals shown in FIGS. 6B and 6D are the same. Both inputs would be recognized by the control as a valid call signal, and the control would proceed to execute the call. The −Ve half cycle can be effectively removed from the signal shown in FIG. 6A, for implementations in which control boards are designed to filter out the −Ve signal if there is any and where the clipping is performed, e.g., taking a zero crossing reference from an interrupt request (IRQ) signal for the call.

Figure 7:
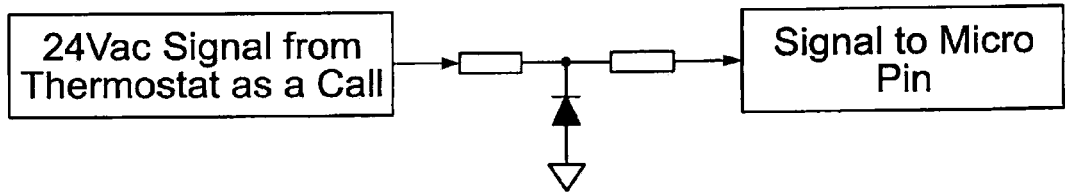
FIG. 7 is a diagram of an example control signal conditioning circuit.

An example circuit is shown in FIG. 7 that is designed for 24VAC signal conditioning on various controls, e.g., furnace control, universal control, and air handling control boards. A diode would remove the −Ve half cycle of FIG. 6A, producing a zero voltage at a microprocessor pin during the −Ve half cycle at input. The modified signal input shown in FIG. 6C sends 0V during a −Ve voltage half cycle. Such modifications can be appropriate and beneficial for power stealing during a W1 or other call.

Figure 8A:
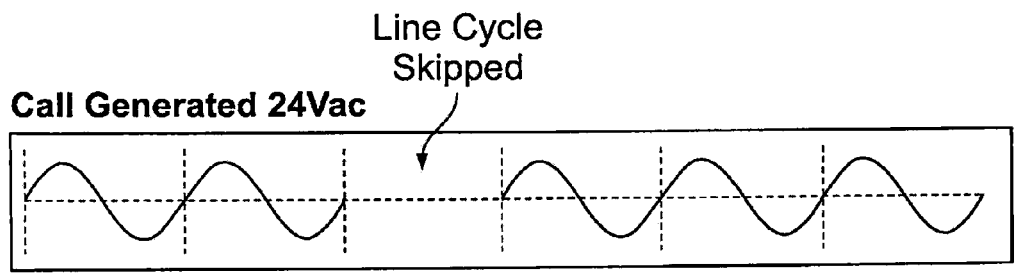
FIGS. 8A-8B are diagrams of climate control system signals generated in accordance with exemplary embodiments of the present disclosure.
Figure 8B:
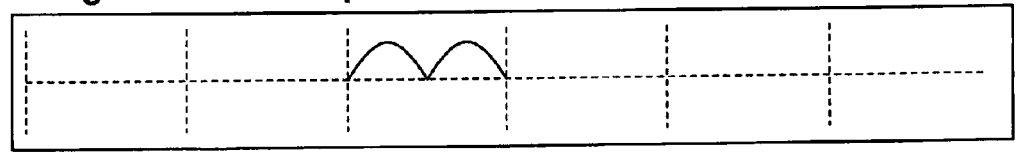

Aspects of the disclosure may be implemented in various additional or alternative ways. For example, a call signal may be momentarily turned OFF for a half cycle, full cycle or any number of cycles within a predetermined number of line cycles. A call signal in which a complete cycle is skipped is shown in FIG. 8A. The signal of FIG. 8A causes a thermostat power stealing circuit bridge rectifier to output a signal as shown in FIG. 8B.

Figure 9A:
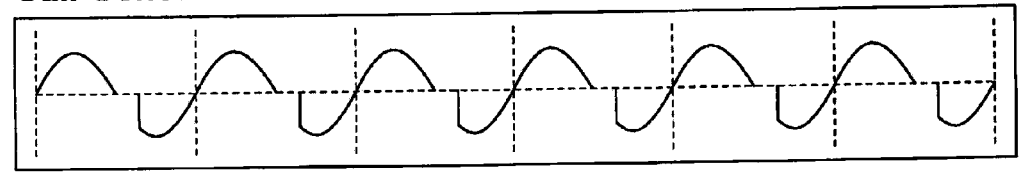
FIGS. 9A-9B are diagrams of climate control system signals generated in accordance with exemplary embodiments of the present disclosure.
Figure 9B:
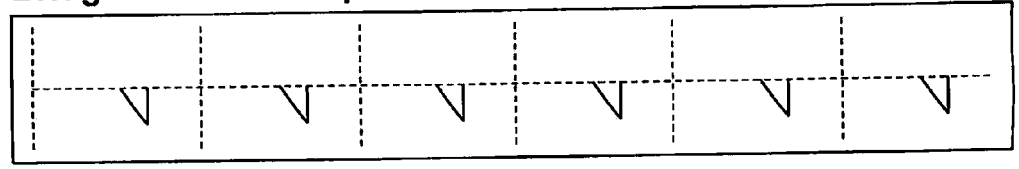

As another example, a call signal may be provided in which a partial signal is skipped for a +Ve or −Ve half cycle. A call signal in which a −Ve half cycle is skipped is shown in FIG. 9A. The signal of FIG. 9A causes a thermostat power stealing circuit bridge rectifier to output a signal as shown in FIG. 9B.

Figure 10A:
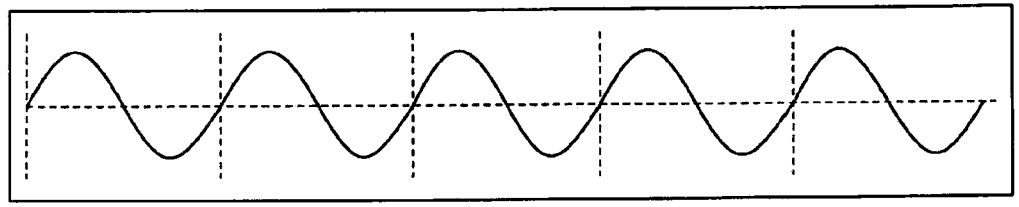
FIGS. 10A-10C are diagrams of climate control system signals generated in accordance with exemplary embodiments of the present disclosure.
Figure 10B:
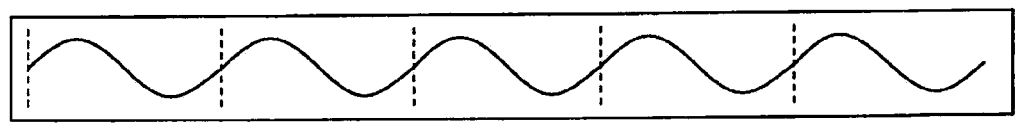
Figure 10C:
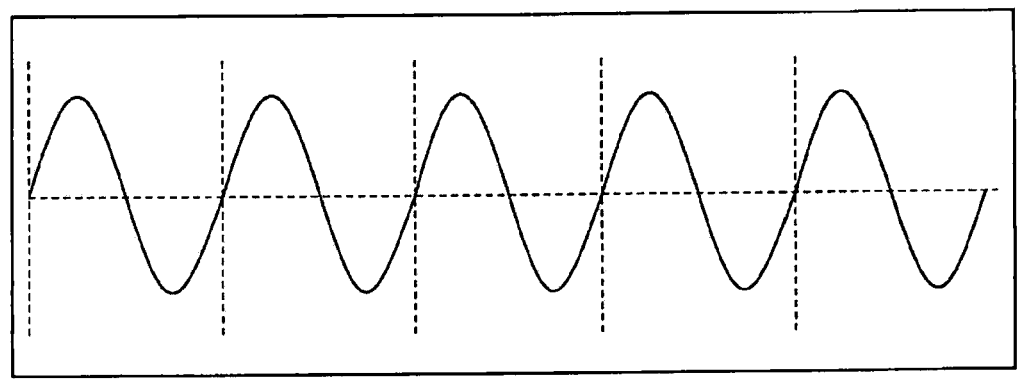

In some implementations the amplitude of a call signal may be changed, for example, by using a voltage divider or other method. An original 24VAC call signal is shown in FIG. 10A. Modified signals having lesser and greater amplitudes are shown in FIGS. 10B and 10C. In various implementations, a signal waveform type could be changed to another signal type, e.g., a square wave as shown in FIG. 11, a triangular wave, etc.

In various embodiments a thermostat or other controller may be configured to determine whether it could perform aspects of power stealing as discussed above, or whether it would be limited to performing conventional power stealing due to the configuration of a particular control, e.g., a control that recognizes both positive and negative portions of a call signal. In one example embodiment a thermostat includes a switch, e.g., a slider switch for which ON or OFF determines whether conventional power stealing or power stealing in accordance with aspects of the disclosure is to be performed. In another example embodiment a thermostat includes a jumper, e.g., across a diode or other component that would otherwise block a negative cycle, thereby allowing a complete cycle to be output to a control and allowing the thermostat to perform conventional power stealing. The jumper may be cut to cause the thermostat to steal power, e.g., during a negative cycle and to refrain, e.g., from providing a negative cycle to the control. Additionally or alternatively, software may be used to control hardware that can cause a thermostat to perform conventional power stealing instead of performing power stealing in accordance with aspects of the disclosure. In various implementations, a jumper or other device and/or method may be used to control an overcurrent limiting circuit, e.g., to determine whether to apply a current limit at all and/or whether to raise a limit to a higher value.

In various embodiments in which a climate control system includes a furnace control, a W1 terminal may be used as a default terminal through which to perform power stealing, e.g., during negative cycles as described above, since many if not most furnace controls are microprocessor-controlled.

For systems in which control(s) are directly under thermostat control and do not include microprocessors, an unused wire may be connected as a "C" wire, in which case power stealing would be unnecessary. If no extra wire is available, then, e.g., a G (fan) wire may be used as a "C" wire and a Y (compressor) wire is tied to the G wire at the control. A user of such an embodiment might not have manual use of the fan, but the fan will cycle when the compressor is turned on.

As shown by the foregoing example embodiments and methods, aspects of the present disclosure can provide a number of advantages and benefits. For example, in various thermostat embodiments a battery backup may be unnecessary. Power can be drawn from a call signal path even if the call is generated by a thermostat. Low cost switching devices can be used for call generation. Thermostats could become thinner and more attractive aesthetically where thick batteries can be eliminated. False call generation can be obviated in many implementations. Compared to conventional power stealing methods and circuits, more power can be stolen during a device off state when it would not cause false call generation. The foregoing capability for stealing large amounts of power is a desirable feature in a thermostat. No changes are required at many if not most controls that receive calls from thermostats or other controllers configured, e.g., as described above. Such controllers would be fully compatible with existing hardware found in many if not most climate control system controls, where such controls have a microprocessor that senses a call for operation on a voltage generated by a dropping resistor connected with the call input terminal.

Thus in various implementations of the disclosure, various methods of power stealing may be provided, e.g., in the absence of a C wire connection, to steal sufficient power regardless of whether or not a call for heat/cool is present. Thermostat batteries can be eliminated where thermostats can run at full capacity using only power stealing.

The foregoing apparatus, systems and methods make it possible to provide a thermostat with power sufficient to support performance of all of its operating functions, including but not limited to operating a wireless transceiver or other wireless module. Using a capacitor as an energy storage medium makes it possible to provide substantially continuous power to the thermostat. It should be noted, however, that although various embodiments of the disclosure are described with reference to thermostats, other or additional configurations and methods are possible in relation to devices, controllers, controls, and control systems other than thermostats.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A controller configured for use in a climate control system, the controller comprising:
    a power stealing circuit configured to be connectible with a control of the climate control system and configured for stealing power from a power source via a signal through the control, without using a common (C) wire from the power source and an RC/RH line where power is drawn when a relay switch in the controller is opened/closed; and
    an overcurrent limiting circuit configured to limit a first portion of the signal to prevent a false call for operation of the control;
    the overcurrent limiting circuit further configured not to limit a second portion of the signal to prevent a false call, where the control is configured to recognize only the first portion as determinative of whether the signal is a call for operation;
    wherein the first portion is a positive portion of the signal and the second portion is a negative portion of the signal.

2. The controller of claim 1, wherein the controller comprises a thermostat.

3. The controller of claim 1, wherein the power stealing circuit is configured to steal power via the first and second portions of the signal when the signal is determined not to be a call for operation.

4. The controller of claim 1, wherein the power stealing circuit is configured to steal power via the second portion of the signal when the signal is determined to be a call for operation.

5. A controller configured for use in a climate control system, the controller comprising:
    a power stealing circuit configured to be connectible with a control of the climate control system and configured for stealing power from a power source via a signal through the control, without using a common (C) wire from the power source and an RC/RH line where power is drawn when a relay switch in the controller is opened/closed;
    an overcurrent limiting circuit configured to limit a first portion of the signal to prevent a false call for operation of the control, the overcurrent limiting circuit further configured not to limit a second portion of the signal to prevent a false call, where the control is configured to recognize only the first portion as determinative of whether the signal is a call for operation; and
    a call generator configured to provide a call for operation of the control, the call including a signal portion configured to be unrecognized by the control as determinative of whether the signal is a call for operation and to provide a voltage for driving power stealing by the power stealing circuit.

6. The controller of claim 5, wherein the first portion is a positive portion of the signal and the second portion is a negative portion of the signal.

7. The controller of claim 5, wherein the call is a call for activating one or more of the following: a furnace control, a universal control, and an air handler control.

8. A controller configured for use in a climate control system, the controller comprising:
    a power stealing circuit configured to be connectible with a control of the climate control system and configured for stealing power from a power source via a signal through the control, without using a common (C) wire from the power source and an RC/RH line where power is drawn when a relay switch in the controller is opened/closed;
    an overcurrent limiting circuit configured to limit a first portion of the signal to prevent a false call for operation of the control, the overcurrent limiting circuit further configured not to limit a second portion of the signal to prevent a false call, where the control is configured to recognize only the first portion as determinative of whether the signal is a call for operation; and
    a call generator configured to provide a call for operation of the control, the call including a signal portion configured to be unrecognized by the control as determinative of whether the signal is a call for operation and to provide a voltage for driving power stealing by the power stealing circuit;
wherein the power stealing circuit is configured to steal power via a call signal path.

9. A method performed by a controller in a climate control system, the method comprising:
configuring and sending a signal having first and second portions to a control of the climate control system such that only the first portion is determinative of whether the signal is a call for operation of the control;
limiting the first portion to prevent a false call for operation of the control; and
stealing power during at least the second portion, without using a common (C) wire from power source and an RC/RH line where power is drawn when a relay switch in the controller is opened/closed;
wherein the first portion is a positive portion of the signal and the second portion is a negative portion of the signal.

10. The method of claim 9, wherein the controller comprises a thermostat.

11. The method of claim 9, wherein the control is one or more of the following: a furnace control, a universal control, and an air handler control.

12. The method of claim 9, further comprising:
receiving a power signal from a power source of the climate control system; and
configuring the signal to the control with an amplitude different from an amplitude of the signal from the power source.

13. The method of claim 9, wherein power is stolen during both the positive and negative portions.

14. A method performed by a controller in a climate control system, the method comprising:
configuring and sending a signal having first and second portions to a control of the climate control system such that only the first portion is determinative of whether the signal is a call for operation of the control;
limiting the first portion to prevent a false call for operation of the control;
stealing power during at least the second portion, without using a common (C) wire from power source and an RC/RH line where power is drawn when a relay switch in the controller is opened/closed; and
generating a call for operation of the control, the call including a signal portion configured to be unrecognized by the control as determinative of whether the signal is a call for operation and to provide a voltage for driving power stealing.

15. The method of claim 14, wherein the first portion is a positive portion of the signal and the second portion is a negative portion of the signal.

16. A controller configured for use in a climate control system, the controller comprising:
a power stealing circuit configured to be connectible with a control of the climate control system and configured for stealing power via a signal from a power source through the control, without using a common (C) wire from power source and an RC/RH line where power is drawn when a relay switch in the controller is opened/closed; and
an overcurrent limiting circuit configured to limit only a positive portion of the signal to prevent a false call for operation of the control, where only the positive portion is determinative of whether the control recognizes the signal as a call for operation.

17. The controller of claim 16, further configured to use a voltage across a dropping resistor of the control to drive the power stealing circuit.

18. The controller of claim 16, wherein the controller comprises a thermostat.

19. The controller of claim 16, further comprising a call generator configured to provide a call for operation of the control, the call including a signal portion configured to be filtered out by the control.

20. The controller of claim 19, wherein the call generator comprises a switching device including one or more of the following: a relay, a triac, a thyristor, a transistor, a diode, a diode in series with a relay, a resistor in series with a relay, a voltage divider, and a MOSFET.

* * * * *